(12) United States Patent
Berstis et al.

(10) Patent No.: US 8,024,209 B2
(45) Date of Patent: Sep. 20, 2011

(54) MONTE CARLO GRID SCHEDULING ALGORITHM SELECTION OPTIMIZATION

(75) Inventors: Viktors Berstis, Austin, TX (US); Xiaolin Li, Piscataway, NJ (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 12/174,755

(22) Filed: Jul. 17, 2008

(65) Prior Publication Data
US 2008/0275804 A1 Nov. 6, 2008

Related U.S. Application Data

(63) Continuation of application No. 10/756,112, filed on Jan. 13, 2004, now abandoned.

(51) Int. Cl.
*G06Q 10/00* (2006.01)
(52) U.S. Cl. .................................................. 705/7.12
(58) Field of Classification Search .................. 705/7.12
See application file for complete search history.

(56) References Cited

U.S. PATENT DOCUMENTS

| | | | | |
|---|---|---|---|---|
| 5,222,192 A * | 6/1993 | Shaefer | ............................ | 706/13 |
| 5,241,465 A | 8/1993 | Oba et al. | | |
| 5,410,598 A | 4/1995 | Shear | | |
| 5,414,845 A * | 5/1995 | Behm et al. | .................... | 718/104 |
| 5,529,077 A | 6/1996 | Faaland et al. | ................ | 364/402 |
| 5,590,063 A | 12/1996 | Golio et al. | | |
| 5,621,903 A | 4/1997 | Luciw et al. | | |
| 5,848,403 A * | 12/1998 | Gabriner et al. | ................. | 706/13 |
| 6,004,015 A | 12/1999 | Watanabe et al. | | |
| 6,032,172 A * | 2/2000 | Kutcher | ......................... | 718/102 |
| 6,035,278 A | 3/2000 | Mansour | ............................ | 705/9 |
| 6,148,274 A | 11/2000 | Watanabe et al. | | |
| 6,278,978 B1 * | 8/2001 | Andre et al. | ....................... | 705/9 |
| 6,289,296 B1 | 9/2001 | Umeno | .............................. | 703/2 |
| 6,338,149 B1 | 1/2002 | Ciccone et al. | | |
| 6,381,586 B1 | 4/2002 | Glasserman et al. | ........... | 705/36 |
| 6,418,462 B1 | 7/2002 | Xu | | |
| 6,442,164 B1 | 8/2002 | Wu | | |
| 6,578,005 B1 | 6/2003 | Lesaint et al. | ..................... | 705/8 |
| 6,587,833 B1 | 7/2003 | Ruffin et al. | | |
| 6,823,315 B1 * | 11/2004 | Bucci et al. | ....................... | 705/9 |
| 6,882,989 B2 | 4/2005 | Stevens | | |
| 6,920,364 B2 | 7/2005 | Nonaka et al. | | |

(Continued)

OTHER PUBLICATIONS

Renders, Jean-Michel; Bersini, Hugues. "Hybridizing Genetic Algorithms with Hill-Climbing Methods for Global Optimization: Two Possible Ways". 1994.*

(Continued)

*Primary Examiner* — Peter Choi
(74) *Attorney, Agent, or Firm* — Yee & Associates, P.C.; Mark C. Vallone; Rudolf O. Siegesmund

(57) ABSTRACT

A method for utilizing the Monte Carlo method to determine the most efficient arrangement of schedulers for a grid using a Scheduler Optimization Program (SOP). The SOP obtains the schedulers and scheduler timetable from memory and randomly selects a time period and scheduler to analyze. The SOP then uses the selected scheduler to modify the scheduler timetable. The SOP then runs the ROI calculator to obtain a ROI property for the modified timetable. If the ROI property for the modified timetable is greater than the ROI property for the original scheduler timetable, the SOP replaces the scheduler timetable with the modified timetable.

3 Claims, 3 Drawing Sheets

U.S. PATENT DOCUMENTS

| | | | |
|---|---|---|---|
| 7,191,435 | B2 | 3/2007 | Lau et al. |
| 7,246,075 | B1 | 7/2007 | Testa |
| 7,395,235 | B2 * | 7/2008 | Dhurandhar et al. ........ 705/36 R |
| 7,603,253 | B2 | 10/2009 | Berstis et al. |
| 7,640,547 | B2 * | 12/2009 | Neiman et al. ................ 718/104 |
| 7,720,634 | B2 | 5/2010 | Berstis et al. |
| 7,813,539 | B2 | 10/2010 | Shibuya et al. |
| 2002/0143590 | A1 | 10/2002 | Dhong et al. |
| 2002/0184069 | A1 | 12/2002 | Kosiba et al. |
| 2003/0177060 | A1 | 9/2003 | Seagraves |
| 2004/0064269 | A1 | 4/2004 | Shibuya et al. |
| 2004/0078310 | A1 | 4/2004 | Shaffer |
| 2005/0197936 | A1 | 9/2005 | Berstis et al. |

OTHER PUBLICATIONS

Chelouah, Rachid; Siarry, Patrick. "Tabu Search Applied to Global Optimization". 2000. European Journal of Operational Research. Issue 123. pp. 256-270.*

Abraham, Ajith; Buyya, Rajkumar; Nath, Baikunth. "Nature's Heuristics for Scheduling Jobs on Computational Grids". 2000. In Proceedings of 8th IEEE International Conference on Advanced Computing and Communications.*

Hamscher, Volker; Schwiegelshohn, Uwe; Streit, Achim; Yahyapour, Ramin. "Evaluation of Job-Scheduling Strategies for Grid Computing". 2000. GRID 2000, LNCS 1971. pp. 191-202.*

Hart, William Eugene. "Adaptive Global Optimization with Local Search". 1994. University of California San Diego.*

Swanson, et al., "Contingency Guide for Information Technology Systems", Jun. 2002, National Institute of Standards of Technology, Technology Administration U.S. Department of Commerce. NIST Special Publication 800-34, 107 pages.

Thompson, "A Simulated-Annealing Heuristic for Shift Scheduling Using Non-Continuously Available Employees", 1996, Computers Ops Res. vol. 2, No. 3, pp. 275-288.

Berstis, "Fundamentals of Grid Computing", Nov. 11, 2002, IBM Corp.,.

USPTO Office Action for U.S. Appl. No. 10/756,150 dated Jun. 9, 2008.

USPTO Final Office Action for U.S. Appl. No. 10/756,150 dated Dec. 15, 2008.

USPTO Notice of Allowance for U.S. Appl. No. 10/756,150 dated Jun. 3, 2009.

USPTO Office Action for U.S. Appl. No. 12/174,747 dated Jun. 26, 2009.

USPTO Notice of Allowance for U.S. Appl. No. 12/174,747 dated Jan. 8, 2010.

* cited by examiner

| | | | | 140 | |
|---|---|---|---|---|---|
| 142 — TIME | 00:01-06:00 | 06:01-12:00 | 12:01-18:00 | 18:01-24:00 |
| 144 — SCHEDULER | A | B | C | B |
| 146 — ROI PROPERTY | 85% | | | |

*FIG. 4*

| MODIFIED TIMETABLE (161) | TIME (162) | SCHEDULER (164) |
|---|---|---|
| 0014 | 00:01-06:00 | A |
| | 06:01-12:00 | B |
| | 12:01-18:00 | C |
| | 18:01-24:00 | A |
| 0015 | 00:01-06:00 | A |
| | 06:01-12:00 | C |
| | 12:01-18:00 | B |
| | 18:01-24:00 | A |

*FIG. 5*

MONTE CARLO GRID SCHEDULING ALGORITHM SELECTION OPTIMIZATION

CROSS-REFERENCE TO RELATED APPLICATION(S)

This application is a continuation application of U.S. utility patent application entitled "Monte Carlo Grid Scheduling Algorithm Selection Optimization" filed on Jan. 13, 2004 and accorded Ser. No. 10/756,112 now abandoned and claims priority therefrom.

FIELD OF THE INVENTION

The present invention is related generally to methods of improving grid computing and specifically to an automated method for improving the selection of schedulers within a grid computing network.

BACKGROUND OF THE INVENTION

Recently, companies have begun to explore the possibilities of using grid computing networks (grids) to increase the company's productivity. A grid comprises a plurality of computers that are networked together. Large or complex computations (jobs) can be broken up into a plurality of smaller, more manageable jobs by the grid. The smaller jobs are then sent out to the computers within the grid for parallel processing. As the individual computers complete their jobs, the grid reassembles the smaller jobs into the completed job. The end result is that the large, complex jobs are processed in significantly less time than is possible on a single computer.

One of the important components of a grid is the scheduler. The scheduler is an algorithm that decides how to distribute the individual job pieces for processing throughout the grid. Although the concept of a scheduler sounds simple, the decision-making process for distribution of the job pieces is extremely complex. A number of decisions must be made as to how the scheduler chooses one grid computer over another. The physical distance between computers, processing speed, available memory, cost of operating grid computers, queue for each computer, the topology of the network connectivity among the computers, special resources (i.e. hardware, software, or licenses) available on particular computers, and connectivity between hard drives are just a few of the factors taken into consideration in creating a scheduler. Logical factors, such as job operating characteristics, priorities of various kinds, operational constraints on the utilization of the grid system, and many others, must also be taken into consideration by the scheduler. Thus, there are a plurality of different schedulers that can be created to distribute the job pieces throughout the grid. Selecting the appropriate scheduler for a grid is made even more complex by the fact that the type of grid traffic changes depending on the time of day or the day of the week, month, or year. One scheduler may be more efficient in the mornings and another scheduler may be more efficient in the evenings. A third scheduler may be more efficient on the weekends or on the last day of every fiscal quarter. Thus, in order to operate a grid at maximum efficiency, a user will ideally change schedulers from time to time, depending on the operating conditions of the grid. It is difficult for a person to constantly analyze and change the schedulers, so an automated method is preferable. Currently, there is no automated method for dynamically or adaptively changing the selection of the schedulers to best use at a given time interval. Consequently, a need exists for an automated method for dynamically and adaptively changing the selection of a scheduler in a grid computing network.

One method for measuring the efficiency of the scheduler is to run a return on investment (ROI) calculator. An example of an ROI calculator is described in U.S. patent application Ser. No. 10/756,150 incorporated herein by reference. The ROI calculator can calculate, using simulation and other modeling methods, the return on investment of an IT infrastructure which employs a particular set of schedulers. The return on investment is a quantitative measure of how effectively the company's information technology (IT) infrastructure is implemented. The ROI calculator can also determine other properties associated with the grid such as operating efficiency, total operating cost, mean time to process individual jobs, and so forth. A user can run a ROI calculator for individual schedulers and operating conditions to determine which scheduler is best suited for which operating conditions. However, as schedulers are continuously modified and updated, an orderly method for applying the ROI calculator to the operating conditions and schedulers is needed. Therefore, what is needed is a method for determining how to select the operating conditions and schedulers using an ROI calculator as a measurement tool.

The Monte Carlo method for selecting criteria is well known in the art. The Monte Carlo method involves the random selection and application of criteria to a model. Proponents of the Monte Carlo method assert that the Monte Carlo method can be more efficient at finding near-optimum solutions than orderly search methods for particularly difficult problems. Schedulers and grid conditions, both being complex, are ideal for the Monte Carlo method. Therefore, what is needed is a method for applying the Monte Carlo method to schedulers and grid conditions for evaluation by an ROI calculator in order to determine the most efficient daily arrangement of schedulers to a grid.

SUMMARY OF THE INVENTION

The present invention, which meets the needs identified above, is a method for utilizing the Monte Carlo method to determine the most efficient arrangement of schedulers for a grid. The software embodiment of the present invention is a Scheduler Optimization Program (SOP). The SOP obtains the schedulers and scheduler timetable from memory and randomly selects a scheduler with which to modify the scheduler timetable at a randomly selected time period. The SOP assigns the randomly selected scheduler to the randomly selected time period in the scheduler timetable. The SOP compares the modified timetable to a previous results file to determine if the modified timetable was analyzed in a previous iteration. If the modified timetable was analyzed in a previous iteration, then SOP proceeds with another random selection as described above.

The SOP then runs the ROI calculator to obtain a ROI property for the modified timetable. The SOP then determines whether the ROI property for the modified timetable is greater than the ROI property for the original scheduler timetable. If the ROI property for the modified timetable is greater than the ROI property for the original scheduler timetable, then the SOP replaces the scheduler timetable with the modified timetable. The SOP repeats the iterative process described herein until a plateau is reached. The SOP may also be configured so that the SOP takes a configurable number of steps away from a more desirable ROI property (i.e. a local maximum) in an attempt to eventually reach a much more desirable ROI property (i.e. a regional or global maximum).

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an illustration of the scheduler timetable of the present invention; and FIG. 5 is an illustration of the previous results file of the present invention.

DETAILED DESCRIPTION OF THE PREFERRED EMBODIMENT

As used herein, the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "efficiency" shall mean a quantitative measure of the amount of grid resources consumed to produce a desired effect.

As used herein, the term "modified timetable" shall mean a scheduler timetable in which the scheduler in a randomly selected time period has been replaced with a randomly selected scheduler.

As used herein, the term "previous results file" shall mean a computer file containing a list of modified schedulers that were analyzed in previous iterations of the present invention.

As used herein, the term "plateau" shall mean a state in which an iterative process no longer improves the ROI property.

As used herein, the term "ROI" is an acronym for return on investment.

As used herein, the term "ROI calculator" shall mean an algorithm for calculating a ROI property of a grid for a given time period and scheduler.

As used herein, the term "ROI property" shall mean a quantitative measure of a property for a grid computing network.

As used herein, the term "scheduler" shall mean a computer algorithm for determining the distribution of pieces of a job in a grid.

As used herein, the term "scheduler timetable" shall mean a table specifying the scheduler that a grid should use for a given time period.

As used herein, the term "time period" shall mean a specific block of time in a scheduler timetable or a modified timetable.

Figure 1:
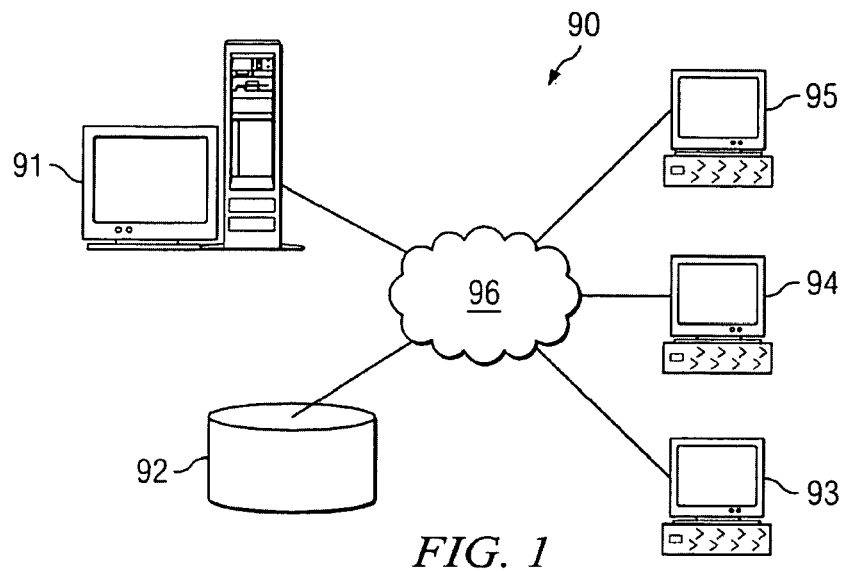
FIG. 1 is an illustration of a computer network used to implement the present invention.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network containing the present invention and is not meant as an architectural limitation.

Figure 2:
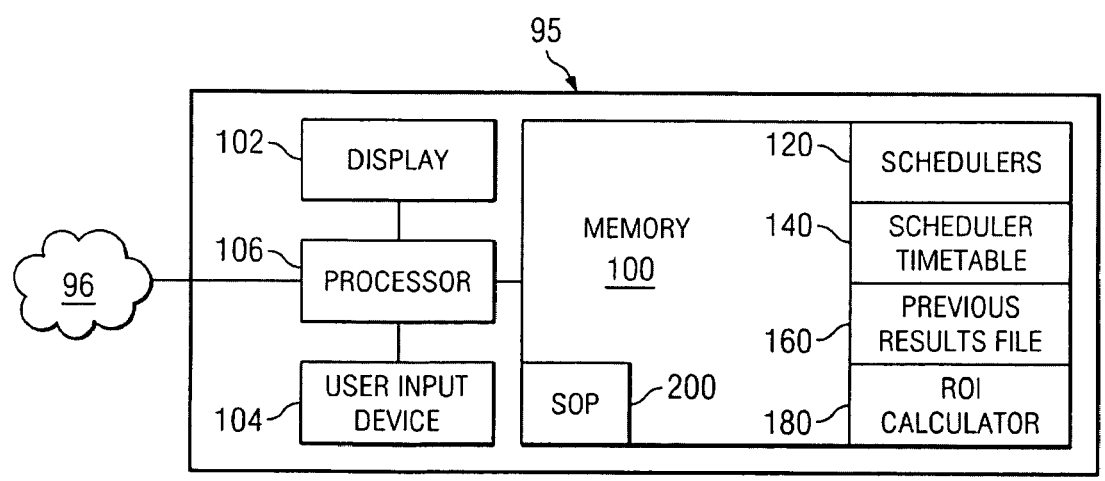
FIG. 2 is an illustration of a computer, including a memory and a processor, associated with the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Scheduler Optimization Program (SOP) 200. SOP 200 described herein can be stored within the memory of any computer depicted in FIG. 1. Alternatively, SOP 200 can be stored in an external storage device such as a removable disk, a CD-ROM, or a USB storage device. Memory 100 is illustrative of the memory within one of the computers of FIG. 1. Memory 100 also contains schedulers 120, scheduler timetable 140, previous results file 160, and return on investment (ROI) calculator 180. The present invention may interface with schedulers 120, scheduler timetable 140, previous results file 160, and ROI calculator 180 through memory 100. As part of the present invention, the memory 100 can be configured with SOP 200. Processor 106 can execute the instructions contained in SOP 200. Processor 106 is also able to display data on display 102 and accept user input on user input device 104. Processor 106, user input device 104, display 102, and memory 100 are part of a computer such as local computer 95 in FIG. 1. Processor 106 can communicate with other computers via network 96.

In alternative embodiments, SOP 200 can be stored in the memory of other computers. Storing SOP 200 in the memory of other computers allows the processor workload to be distributed across a plurality of processors instead of a single processor. Further configurations of SOP 200 across various memories are known by persons of ordinary skill in the art. The present invention may be a method, a stand alone computer program, or a plug-in to an existing computer program. Persons of ordinary skill in the art are aware of how to configure computer programs, such as those described herein, to plug into an existing computer program.

Schedulers 120 are computer algorithms that decide where the pieces of a job are distributed throughout the grid. For the purposes herein, schedulers 120 are represented as scheduler A, scheduler B, scheduler C and so forth. Persons of ordinary skill in the art will appreciate that each letter represents a scheduler with a particular configuration. Scheduler timetable 140 is a computer file that tells the grid computing system which scheduler to run at which times. Scheduler timetable 140 may be for a day, a week, a month, a year, or any other time period as determined by a person of ordinary skill in the art. Previous results file 160 is a listing of the modified timetables that were previously selected by SOP 200. ROI calculator 180 contains a mathematical model of the operating conditions within the grid. ROI calculator 180 calculates a ROI property for the modified scheduler. The ROI properties include the time for return on initial investment, the annual operating cost savings, the efficiency with which the grid is being utilized, and so forth. Persons skilled in the art are aware of other types of calculators that can determine ROI properties.

Figure 3:
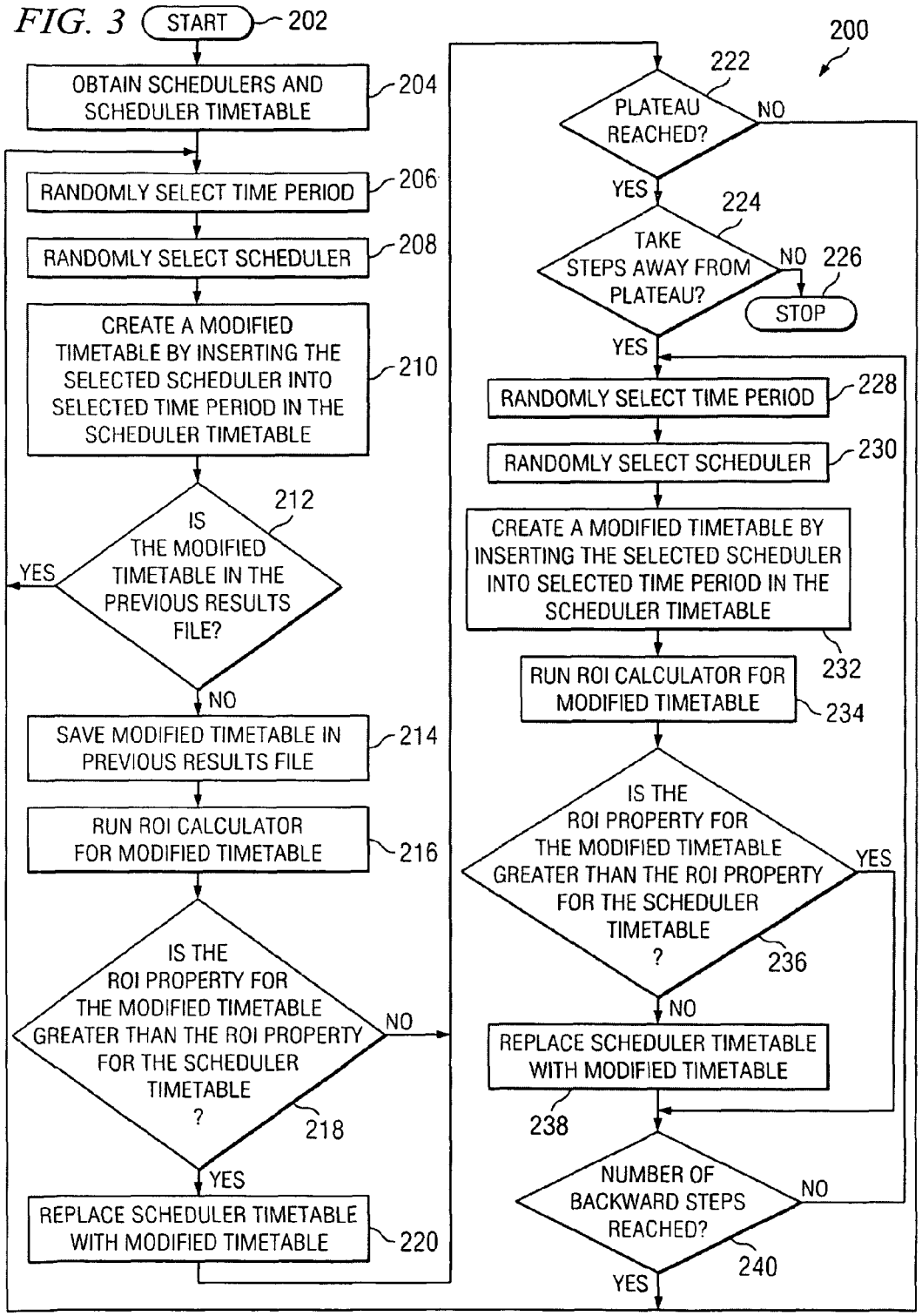
FIG. 3 is an illustration of the logic of the Scheduler Optimization Program (SOP) of the present invention.

FIG. 3 illustrates the logic of Scheduler Optimization Program (SOP) 200 of the present invention. SOP 200 is a program that uses the Monte Carlo method to optimize the selection of schedulers 120 for the grid computing system. SOP 200 starts (202) anytime a user desires to optimize scheduler timetable 140 of the present invention. SOP 200 then obtains schedulers 120 and scheduler timetable 140 from memory (204). Scheduler timetable 140 contains the ROI property for the current arrangement of schedulers 120 for a specific time period, such as a single day. SOP 200 then randomly selects a time period to modify in scheduler timetable 140 (206). The time period is a specific block of time within scheduler timetable 140. SOP 200 then randomly selects a scheduler to replace the original scheduler in a randomly selected time period within scheduler timetable 140 (208). SOP 200 selects the scheduler from the plurality of schedulers 120.

SOP 200 then creates a modified timetable by inserting the randomly selected scheduler into the randomly selected time period in the scheduler timetable (210). SOP 200 then determines whether the modified timetable created in step 210 is in previous results file 160 (212). By checking the modified timetable against previous results file 160, the present invention does not run ROI calculator 180 when the present invention has previously run ROI calculator 180 for the same modified timetable in a previous iteration of SOP 200. If the modified timetable is in previous results file 160, then SOP 200 returns to step 206. If the modified timetable is not in previous results file 160, then SOP 200 saves the modified timetable in previous results file 160 (214). SOP 200 then runs ROI calculator 180 to obtain an ROI property for the modified timetable (216). For the illustrative purposes herein, the ROI property is the grid efficiency. Persons of ordinary skill in the art are aware that any of the ROI properties calculated by ROI calculator 180 can be used to optimize the selection of schedulers 120 herein.

At step 218, SOP 200 determines whether the ROI property for the modified timetable is greater than the ROI property for the original scheduler timetable 140 (218). The term "greater than" in step 218 is meant to mean more desirable. If the ROI property is the grid efficiency, then at step 218 SOP 200 determines whether the grid efficiency for the modified timetable is greater than the grid efficiency for the original scheduler timetable 140. If the grid efficiency for the modified timetable is not greater than the grid efficiency for the original scheduler timetable 140, then SOP 200 proceeds to step 232. If the grid efficiency for the modified timetable is greater than the grid efficiency for the original scheduler timetable 140, then SOP 200 replaces the original scheduler timetable 140 with the modified timetable (220). SOP 200 also replaces the original ROI property with the ROI property for the modified timetable calculated in step 216. Persons of ordinary skill in the art will appreciate that SOP 200 could also rank the different scheduler timetables 140 and/or modified timetables according to their ROI property and run the modification process described herein on the top N number of scheduler timetables 140 and/or modified timetables in the ranked list, wherein N is a user-configurable number. The present may also be embodied such that a random scheduler is selected to replace a scheduler in a random time period in a randomly selected scheduler timetable 140 or modified timetable in the ranked list.

SOP 200 then determines whether a plateau has been reached for scheduler timetable 140 (222). A plateau may be reached whenever SOP 200 has not modified scheduler timetable 140 in a certain number (i.e. one thousand) of iterations. Alternatively, a user of the present invention may define when a plateau is reached, such as when scheduler timetable 140 has not produced an improved ROI property after a configurable number of attempts or has an acceptable ROI property. Further in the alternative, a user of the present invention may choose to stop the iterative process of SOP 200 by manually indicating that a plateau has been reached. If the present invention is performing the modification process on a ranked list of scheduler timetables 140 and/or modified timetables, then a plateau may be defined as a user-configurable number of attempts in which the top N timetables have not changed, N being a user-configurable number. Persons of ordinary skill in the art are aware of other methods of determining if a plateau has been reached. If a plateau has not been reached, SOP 200 returns to step 206. If a plateau has been reached, SOP 200 proceeds to step 224.

Steps 202 through 222 of SOP 200 of the present invention continuously seek to improve the grid computing network by improving the ROI property. However, the present invention may be configured such that SOP 200 takes a user-configurable number of steps towards a less desirable result in an effort to ultimately achieve a more desirable result. As an analogy, if a person only goes uphill, then the person will make it to the top of the hill he is on, but he will never reach the top of the highest hill in the area (unless he happens to have climbed the highest hill in the area the first time). In order to reach the top of the highest hill in the area, the person must descend and traverse a valley before climbing a new hill. In order to retain the ability to achieve a possibly superior result, a person of ordinary skill in the art will appreciate that SOP 200 can be configured so that SOP 200 takes a user-configurable number of steps towards an undesirable result in order to possibly achieve a much more desirable result. Steps 224 through 240 of SOP 200 illustrate the process of taking steps towards the undesirable result.

At step 224, SOP 200 determines if the user has indicated a desire to take steps away from the plateau (224). If the user has indicated a desire to take steps away from the plateau, the user will also specify how many steps to take away from the plateau. If the user has not indicated a desire to take steps away from the plateau, SOP 200 ends (226). If the user has indicated a desire to take steps away from the plateau, then SOP 200 randomly selects a time period to modify in scheduler timetable 140 (228). SOP 200 then randomly selects a scheduler to replace the original scheduler in a randomly selected time period within scheduler timetable 140 (230). SOP 200 then creates a modified timetable by inserting the randomly selected scheduler into the randomly selected time period in the scheduler timetable (232). SOP 200 then runs ROI calculator 180 to obtain an ROI property for the modified timetable (234), and proceeds to step 236.

At step 236, SOP 200 determines whether the ROI property for the modified timetable is greater than the ROI property for the original scheduler timetable 140 (236). If the ROI property for the modified timetable is greater than the ROI property for the original scheduler timetable 140, then SOP 200 proceeds to step 240. If the grid efficiency for the modified timetable is not greater than the grid efficiency for the original scheduler timetable 140, then SOP 200 replaces the original scheduler timetable 140 with the modified timetable (238). SOP 200 also replaces the original ROI property with the ROI property for the modified timetable calculated in step 234. SOP 200 then determines if SOP 200 has reached the user-configured number of backwards steps (240). If SOP 200 has not reached the user-configured number of backwards steps, SOP 200 returns to step 228. If SOP 200 has reached the user-configured number of backwards steps, SOP 200 returns to step 206. If desired, the results from the actual grid operation using a particular scheduler can be saved and compared against the ROI calculator's 180 estimate. Adjustments can then be made to ROI calculator's 180 template in order to improve the accuracy of ROI calculator 180. Persons skilled in the art will recognize that steps 224 through 240 may be included in SOP 200 prior to a plateau being reached and, if so, these steps may be implemented on a random basis. In addition, the user configurable number of steps may be replaced by a randomly determined number of steps.

SOP 200 of the present invention modifies scheduler timetable 140 with a new scheduler 120 and calculates the ROI property for the entire modified scheduler. It is possible that a similar result may be achieved by dividing the scheduler timetable 140 into a plurality of short time periods, each with one scheduler 120, and running the ROI calculator on the individual scheduler timetable pieces. However, the described embodiment is preferable to an embodiment in which the scheduler timetable 140 is divided into a plurality of short time periods because the selection of one scheduler 120 affects the performance of subsequent schedulers 120. For example, scheduler B may be very efficient at processing memory intensive jobs. If scheduler A is operating before scheduler B and prioritizes memory intensive jobs, then when scheduler B comes online, there are relatively few memory intensive jobs and scheduler B's efficiency is low. Conversely, if scheduler C is operating before scheduler B and prioritizes processor intensive jobs, then when scheduler B comes online, there may be many memory intensive jobs and scheduler B's efficiency is high. Thus, the performance of any one scheduler 120 is dependent on the type of jobs that remain after the previous scheduler 120 is taken offline. Therefore, the evaluation of scheduler timetable 140 as a whole is preferable.

FIG. 4 illustrates scheduler timetable 140 of the present invention. Scheduler timetable 140 comprises three rows: time 142, scheduler 144, and ROI property 146. Time 142 is the specific time period of implementation of scheduler 120. Scheduler 144 indicates which specific scheduler 120 will be implemented at the appropriate time 142. ROI property 146 is the ROI property that is used in step 218 of SOP 200. In FIG. 4, ROI property 146 is the grid network efficiency.

FIG. 5 illustrates previous results file 160. Previous results file 160 comprises modified timetable ID 161, time 162, and scheduler 164. Modified timetable ID 161 is a counter used to distinguish individual modified timetables from each other. Time 162 and scheduler 164 are the components of a modified timetable, similar to scheduler timetable 140 depicted in FIG. 4. Time 162 is the time period for the modified timetable. Time 162 is like time 142 in FIG. 4. Scheduler 164 is scheduler 120 for the modified timetable. Scheduler 164 is like scheduler 144 in FIG. 4.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method for improving an allocation of a plurality of schedulers within a grid computing network, the method comprising:
  a computer obtaining the plurality of schedulers, each of the plurality of schedulers comprising a computer algorithm for determining a distribution of a plurality of pieces of a job in the grid computing network;
  the computer obtaining a first scheduler timetable, wherein the first scheduler timetable is a table specifying a first scheduler that the grid computing network uses for a first time period, a second scheduler that the grid computing network uses for a second time period, and a first quantitative measure of a grid efficiency for the grid computing network using the first scheduler timetable;
  the computer creating a second scheduler timetable by randomly selecting a time period from the first scheduler timetable, randomly selecting a scheduler from the plurality of schedulers, inserting an identifier of the scheduler in the second scheduler timetable in a slot corresponding to the time period, and including one or more scheduler identifiers from the first scheduler timetable;
  the computer updating a previous results file by determining whether the second scheduler timetable is in the previous results file, and responsive to determining an absence of the second scheduler timetable in the previous results file, saving the second scheduler timetable in the previous results file;
  the computer calculating a second quantitative measure of the grid efficiency for the grid computing network using an ordering of schedulers in the second scheduler timetable;
  the computer determining whether the second quantitative measure of the grid efficiency for the grid computing network is greater than the first quantitative measure of the grid efficiency for the grid computing network;
  the computer, responsive to determining that the second quantitative measure of the grid efficiency for the grid computing network is greater than the first quantitative measure of the grid efficiency for the grid computing network, replacing the first quantitative measure of the grid efficiency for the grid computing network with the second quantitative measure of the grid efficiency for the grid computing network and replacing the first scheduler timetable with the second scheduler timetable;
  the computer determining whether a plateau has been reached, wherein the plateau is one in which an iterative process cannot improve a quantitative measure of the grid efficiency for the grid computing network; and
  the computer responsive to determining that the plateau has been reached, and responsive to an input specifying a number of backward steps, performing operations in which the first scheduler timetable is only replaced with the second scheduler timetable when the second quantitative measure of the grid efficiency for the grid computing network is less than or equal to the first quantitative measure of the grid efficiency for the grid computing network.

2. A computer system for improving an allocation of a plurality of schedulers within a grid computing network, the computer system comprising:
  one or more processors, one or more computer-readable tangible storage devices, and one or more computer readable memories;
  program instructions, stored on at least one of the one or more computer-readable tangible storage devices for execution by at least one of the one more processors via at least one of the one or more computer readable memories, to obtain the plurality of schedulers, each of the plurality of schedulers comprising a computer algorithm for determining a distribution of a plurality of pieces of a job in the grid computing network;
  program instructions, stored on at least one of the one or more computer-readable tangible storage devices for execution by at least one of the one more processors via at least one of the one or more computer readable memories, to obtain a first scheduler timetable, wherein the first scheduler timetable is a table specifying a first scheduler that the grid computing network uses for a first time period, a second scheduler that the grid computing network uses for a second time period, and a first scheduler timetable quantitative measure of a grid efficiency for the grid computing network;

program instructions, stored on at least one of the one or more computer-readable tangible storage devices for execution by at least one of the one more processors via at least one of the one or more computer readable memories, to create a second scheduler timetable by randomly selecting a time period from the first scheduler timetable, randomly selecting a scheduler from the plurality of schedulers, inserting an identifier of the scheduler in the second scheduler timetable in a slot corresponding to the time period, and including one or more scheduler identifiers from the first scheduler timetable;

program instructions, stored on at least one of the one or more computer-readable tangible storage devices for execution by at least one of the one more processors via at least one of the one or more computer readable memories, to update a previous results file by determining whether the second scheduler timetable is in the previous results file, and responsive to determining an absence of the second scheduler timetable in the previous results file, to save the second scheduler timetable in the previous results file;

program instructions, stored on at least one of the one or more computer-readable tangible storage devices for execution by at least one of the one more processors via at least one of the one or more computer readable memories, to calculate a second scheduler timetable quantitative measure of the grid efficiency for the grid computing network using an ordering of schedulers in the second scheduler timetable;

program instructions, stored on at least one of the one or more computer-readable tangible storage devices for execution by at least one of the one more processors via at least one of the one or more computer readable memories, to determine whether the second quantitative measure of the grid efficiency for the grid computing network is greater than the first quantitative measure of the grid efficiency for the grid computing network;

program instructions, stored on at least one of the one or more computer-readable tangible storage devices for execution by at least one of the one more processors via at least one of the one or more computer readable memories, to replace, responsive to determining that the second quantitative measure of the grid efficiency for the grid computing network is greater than the first quantitative measure of the grid efficiency for the grid computing network, the first quantitative measure of the grid efficiency for the grid computing network with the second quantitative measure of the grid efficiency for the grid computing network to replace and the first scheduler timetable with the second scheduler timetable;

program instructions, stored on at least one of the one or more computer-readable tangible storage devices for execution by at least one of the one more processors via at least one of the one or more computer readable memories, to determine whether a plateau has been reached, wherein the plateau is one in which an iterative process cannot improve a quantitative measure of the grid efficiency for the grid computing network; and program instructions, stored on at least one of the one or more computer-readable tangible storage devices for execution by at least one of the one more processors via at least one of the one or more computer readable memories, to perform, responsive to determining that the plateau has been reached, and responsive to an input specifying a number of backward steps, operations in which the first scheduler timetable is only replaced with the second scheduler timetable when the second quantitative measure of the grid efficiency for the grid computing network is less than or equal to the first quantitative measure of the grid efficiency for the grid computing network.

3. A computer program product for improving an allocation of a plurality of schedulers within a grid computing network, the computer program product comprising:

one or more computer readable tangible storage devices;

program instructions, stored on at least one of the one or more computer-readable, tangible storage devices, to obtain the plurality of schedulers, each of the plurality of schedulers comprising a computer algorithm for determining a distribution of a plurality of pieces of a job in the grid computing network;

program instructions, stored on at least one of the one or more computer-readable, tangible storage devices, to obtain a first scheduler timetable, wherein the first scheduler timetable is a table specifying a first scheduler that the grid computing system uses for a first time period, a second scheduler that the grid computing system uses for a second time period, and a first quantitative measure of a grid efficiency for the grid computing network using the first scheduler timetable;

program instructions, stored on at least one of the one or more computer-readable, tangible storage devices, to create a second scheduler timetable by randomly selecting a time period from the first scheduler timetable, randomly selecting a scheduler from the plurality of schedulers, inserting an identifier of the scheduler in the second scheduler timetable in a slot corresponding to the time period, and including one or more scheduler identifiers from the first scheduler timetable;

program instructions, stored on at least one of the one or more computer-readable, tangible storage devices, to update a previous results file by determining whether the second scheduler timetable is in the previous results file, and responsive to determining an absence of the second scheduler timetable in the previous results file, saving the second scheduler timetable in the previous results file;

program instructions, stored on at least one of the one or more computer-readable, tangible storage devices, to calculate a second quantitative measure of the grid efficiency for the grid computing network using an ordering of schedulers in the second scheduler timetable;

program instructions, stored on at least one of the one or more computer-readable, tangible storage devices, to determine whether the second quantitative measure of the grid efficiency for the grid computing network is greater than the first quantitative measure of the grid efficiency for the grid computing network;

program instructions, stored on at least one of the one or more computer-readable, tangible storage devices, to replace, responsive to determining that the second quantitative measure of the grid efficiency for the grid computing network is greater than the first quantitative measure of the grid efficiency for the grid computing network, replacing the first quantitative measure of the grid efficiency for the grid computing network with the second quantitative measure of the grid efficiency for the grid computing network and to replace the first scheduler timetable with the second scheduler timetable;

program instructions, stored on at least one of the one or more computer-readable, tangible storage devices, to determine whether a plateau has been reached, wherein the plateau is one in which an iterative process cannot improve a quantitative measure of the grid efficiency for the grid computing network; and program instructions, stored on at least one of the one or more computer-readable, tangible storage devices, to perform, responsive to determining that the plateau has been reached, and responsive to an input specifying a number of backward steps, operations in which the first scheduler timetable is only replaced with the second scheduler timetable when the second quantitative measure of the grid efficiency for the grid computing network is less than or equal to the first quantitative measure of the grid efficiency for the grid computing network.

* * * * *